Jan. 2, 1940.  C. E. SPINDLER  2,185,573
FUEL FEED FOR INTERNAL COMBUSTION ENGINES
Filed June 25, 1938  2 Sheets-Sheet 2
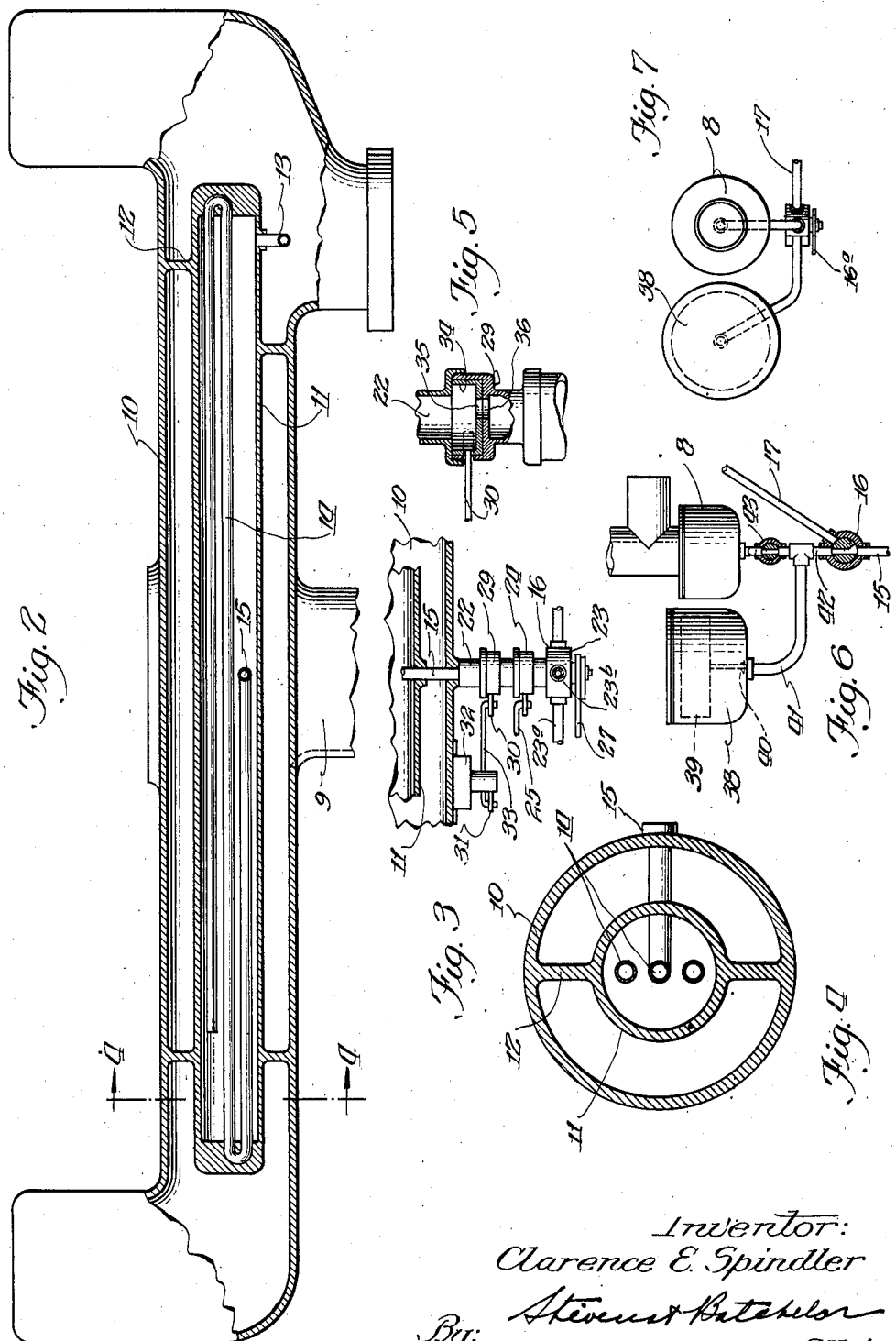
Inventor:
Clarence E. Spindler
By: Stevens & Batchelor
Atty's.

Patented Jan. 2, 1940

2,185,573

UNITED STATES PATENT OFFICE 2,185,573

FUEL FEED FOR INTERNAL COMBUSTION ENGINES

Clarence E. Spindler, Blue Island, Ill.

Application June 25, 1938, Serial No. 215,864

5 Claims. (Cl. 123—133)

My invention relates to fuel systems for internal combustion engines, and more particularly to the treatment of the fuel in order to best adapt it for efficient combustion, and my main object is to provide an arrangement accessory and easily adaptable to the conventional internal combustion engine for the purpose mentioned.

A further object of the invention is to provide a fuel vaporizing unit which is so constituted as to convert the liquid fuel into a dry gas, whereby to minimize the possibilities of condensation and improve combustion.

A still further object of the invention is to provide a vaporizing unit which is so connected to the regular fuel feed of the engine as to make it possible to use the regular fuel feed for starting purposes and to changes to the novel feed after the engine has developed a predetermined working temperature.

An additional object of the invention is to construct the novel fuel system along lines of simplicity and economy.

With the above objects in view, and any others which may suggest themselves from the description to follow, a better understanding of the invention may be had by reference to the accompanying drawings, in which—

Fig. 2 is an enlarged section of the exhaust manifold, showing a portion of the system within it;

Fig. 3 is a fragmental section of the frontal part of the said manifold, with accessory parts in plan view;

Fig. 4 is a magnified section on the line 4—4 of Fig. 2;

Fig. 5 is a magnified view, partly in section, of a valve shown in Fig. 3;

Fig. 6 is an elevation, partly in section, of a portion of the system which applies to the engine carburetor; and Fig. 7 is a top plan view of the showing in Fig. 6.

Figure 1:
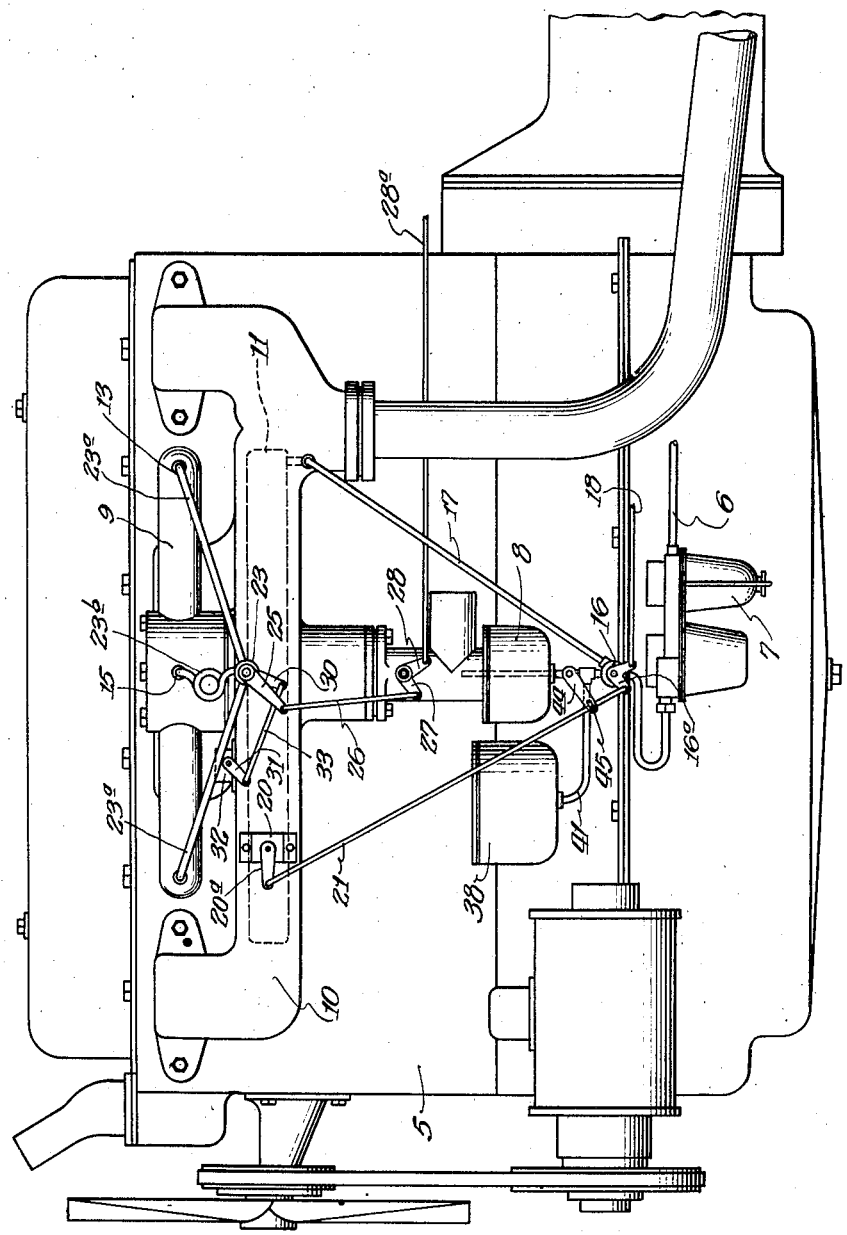
Fig. 1 is an elevation of the novel fuel system as applied to a conventional internal combustion engine.

It is a familiar fact that the efficiency obtained from liquid fuel fed into an internal combustion engine is rarely high, owing to the fact that the fuel is not sufficiently atomized or commingled with the air in which it travels, so that some of the fuel is continually expelled in unconsumed form. While various devices or means have been developed from time to time to obtain the thorough vaporization of the fuel after it leaves the carburetor, none has apparently been practical from the viewpoints of efficiency and economy, and it has therefore been my intention to design a system for this purpose which attains the desired efficiency by simple and easily applicable means.

In accordance with the foregoing, specific reference to the drawings indicates a typical internal combustion engine at 5, its fuel line at 6, the fuel pump at 7, the carbureter at 8, the inlet manifold at 9, and the exhaust manifold at 10.

The vaporizer in the novel fuel system consists of a liquid chamber 11 built or cast into the exhaust manifold 10 by means of spacers 12 or other suitable means, whereby to occupy a central position within the manifold. The chamber 11 has an inlet tube 13 from the front of the manifold. On the inside of the chamber is an undulating longitudinal tube 14 which has an open inlet at one end and an outlet 15 to the front of the manifold. It is my purpose to lead the liquid fuel into the chamber 11 by way of its inlet 13 after the chamber has become heated to a predetermined degree from the operation of the engine. The pre-heating of the fuel occurs in the chamber 11, and the super-heating thereof occurs when the vaporized fuel enters the undulating tube 14, so that the fuel issues as a dry gas from the outlet 15.

While the fuel pump has a standard piping connection 45 to the carbureter 8, for the preesnt purpose the connection is intercepted by a two-way valve 16, whose lever 16a may be turned to divert the fuel from a vaporizing lead 17 connecting valve 16 with the supply inlet 13. A rod 18 operable from the dash—if the engine is in an automobile—forms a manual control for the valve 16, and it may be assumed that the feed is directed to the carbureter when the engine is being started, but diverted from the carbureter to the vaporizer after the engine has assumed a suitable or predetermined working temperature. With air drawn through the carbureter as usual, a mixture is produced which is dry and therefore devoid of any liquid or raw fuel, enabling the thorough combustion of the fuel mixture with resultant added power, freedom from carbon deposits or loss of fuel into the exhaust, and marked fuel economy.

The regular fuel feed is in use as under present conditions while the engine is cold or runs at temperatures below normal. Yet, when the normal running temperature is reached, the economy of the new arrangement may be utilized by the single operation of the control rod, whereby to admit fuel to the vaporizer instead of to the carbureter. Since it is ordinarily impossible to tell or impracticable to ascertain when the engine has assumed a suitable temperature for the action of the vaporizer, I have included a connection to serve as an automatic control. Thus, a thermostat is shown at 20, extended with an arm 20a, which is moved in a rotary direction by the thermostat when the desired engine temperature is reached. The arm 20a is connected by means of a rod 21 to a branch 16b of the lever 16a which controls the two-way valve 16, so that the action of the thermostat will ordinarily turn such valve at the desired time without attention on the part of the driver. Yet, should the thermostat or its connection get out of order, the hand-control 18 is always available to make the change. The vaporizer outlet 15 opens into an external conduit 22, terminating with a chamber 23 from which branches 23a and 23b lead to the lateral and medial portions of the inlet manifold 9, the branch 23b being in the form of a coil to permit it to have the same length as the branches 23a and thus serve for a uniform supply of the gas to the different portions of the manifold, it being understood that the air regularly drawn into the manifold by the engine suction serves to unite with the gas in forming the fuel mixture.

In order that the supply of the gas from the vaporizer may be controlled as desired, the conduit 22 receives a valve 24 at a point behind the chamber 23, such valve having an operating lever 25 connected by a link 26 to a branch 27 of the throttle control lever 28 from which the usual operating rod 28a is extended. The throttle and the valve 24 are thus operated from the same source. However, when the vaporizer is in use there is no liquid fuel in the carbureter so that the operation of the throttle produces no result and does no harm. Conversely no fuel is admitted to the vaporizer, the operation of the valve 24 is likewise ineffectual.

It is possible that the gas may not attain its best or superheated condition even when the two-way valve 16 is automatically actuated, and I therefore provide a safe-guard against the premature feed of the gas to the inlet manifold in the form of a second valve 29 in the conduit 22. This valve has an operating lever 30 and is actuated by the lever 31 of a second thermostat 32, acting through a link 33. Preferably, the thermostat 32 is regulated to act before the thermostat 20, so as to assure the proper temperature of the engine for the feed of the vaporized fuel as well as an open channel to the control valve 24 and distributing chamber 23 before the thermostat 20 acts to admit raw fuel into the vaporizer.

The valves 24 and 29 are of the simple rotary type. One of these valves is shown in section in Fig. 5 and contains an internal cup 34 whose bottom has an opening 35 adapted to register with an opening 36 in the valve housing 29 or 24 when the lever 30 or 25 is operated as shown in Fig. 5. The particular type of valve is shown merely as an example and any other type which is operable in the same manner or to produce the same result may be employed.

In the operation of the system, the change from the regular fuel feed to the vaporizer cuts off the fuel from the carbureter. Thus, the continued running of the engine will draw all the remaining fuel from the carbureter, so that when the engine has cooled off after a period of operation and the initial fuel feed is restored, no fuel will be available in the carbureter, and the engine will have to be cranked until its fuel pump operates long enough to fill the carbureter. In order to avoid this difficulty and the incidental drain on the storage battery, I have provided a reservoir from which the refilling of the carbureter is immediately and automatically available. Thus, as noted particularly in Figs. 6 and 7, an auxiliary fuel vessel 38 is provided at one side of the carbureter, such vessel also having the customary float 39 and needle valve 40. The bottom of the vessel 38 communicates by means of a duct 41 with the pipe 42 which leads the fuel from the two-way valve 16 to the carbureter. However, between the entrance of the duct 41 and the carbureter the pipe 42 receives a plug valve 43, the operating lever 44 of the same having a connection 45 with the rod 21 which leads from the thermostat 20 to the two-way valve 16.

The position of the rod 21 as shown is indicative of the regular fuel system being in operation. It is thus seen in Fig. 6 that the valve 43 is open, while the two-way valve 16 is open to the pipe 42 but closed to the vaporizing lead 17. With the engine in operation, it may be assumed that the pump has filled both the carbureter and the auxiliary vessel 38 with the liquid fuel. However, should the thermostat 20 induce a movement of the two-way valve 16 in a clockwise direction, the pipe 42 will be cut off as well as the valve 43 closed, by the single movement of the rod 21. The fuel in the vessel 38 and its duct 41 will thus be trapped between the valves 16 and 43, so that it cannot escape in a downward direction or be drawn off by the carbureter by the continued suction of the engine. The vessel 38 therefore serves as a reservoir for such fuel, which becomes available when the valves 16 and 43 have been turned back by the cooling of the engine after a period of operation.

It will be evident from the above description that I have provided a fuel system which is of a simple character, makes for high efficiency and economy while in use, and is easily adaptable to conventional internal combustion engines. The system provides properly timed automatic controls, yet permits the supply of the vaporized fuel to the engine to be controlled as for the regular fuel feed. In addition, a safe-guard is provided to retain the regular feed in case the automatic action fails. Finally the system employs parts and units based on standard mechanical practice and is therefore of a nature to be economically manufactured and installed.

While I have described the invention along specific lines, various minor changes or refinements may be made therein without departing from its principle, and I desire to consider all such changes and refinements as coming within the scope and spirit of the appended claims.

1. In a charge forming device for an internal combustion engine including a carburetor, an exhaust heated vaporizer associated with the exhaust pipe of said engine and a two-way valve for selectively feeding fuel to said carburetor and vaporizer; means for transmitting fuel from said vaporizer to the intake manifold of said engine, said means including a plurality of conduits each leading to a different point of said manifold.

2. In a charge forming device for an internal combustion engine including a carburetor, an exhaust heated vaporizer associated with the exhaust pipe of said engine and a two-way valve for selectively feeding fuel to said carburetor and vaporizer; means for transmitting fuel from said vaporizer to the intake manifold of said engine, said means including a plurality of conduits each leading to a different point of said manifold, and each of said conduits being of substantially the same length.

3. In a charge forming device for an internal combustion engine including a carburetor, means for supplying air to said carburetor, a main fuel line, a pair of branch fuel lines diverging from said main fuel line, one branch fuel line leading directly to said carburetor, an exhaust heated fuel vaporizer associated with the exhaust pipe of said engine, the second branch fuel line leading from said first fuel line through said vaporizer to said carburetor, and a two-way valve at the junction of said branch fuel lines for selectively feeding fuel to said branch lines; a thermostat control for said valve to actuate the same to divert fuel from said first branch to said second branch when said vaporizer has attained a predetermined temperature.

4. In a charge forming device for an internal combustion engine including a carburetor, means for supplying air to said carburetor, a main fuel line, a pair of branch fuel lines diverging from said main fuel line, one branch fuel line leading directly to said carburetor, an exhaust heated fuel vaporizer associated with the exhaust pipe of said engine, the second branch fuel line leading from said first fuel line through said vaporizer to said carburetor, and a two-way valve at the junction of said branch fuel lines for selectively feeding fuel to said branch lines; means for actuating said two-way valve, an auxiliary fuel container having a normally open connection with said carburetor, means for closing said connection to cut said container off from said carburetor, and said valve actuating means being operatively connected to said last named means to actuate the same with each actuation of said valve actuating means.

5. In a charge forming device for an internal combustion engine including a carburetor, means for supplying air to said carburetor, a main fuel line, a pair of branch fuel lines diverging from said main fuel line, one branch fuel line leading directly to said carburetor, an exhaust heated fuel vaporizer associated with the exhaust pipe of said engine, the second branch fuel line leading from said first fuel line through said vaporizer to said carburetor, and a two-way valve at the junction of said branch fuel lines for selectively feeding fuel to said branch lines; means for actuating said two-way valve, an auxiliary fuel container having a normally open connection with said carburetor, and a valve for closing said connection, said last valve adapted to be closed when said two-way valve has been actuated to feed fuel to said carburetor through said vaporizer, whereby to prevent the feeding of said auxiliary supply of fuel to said carburetor while fuel is being fed through said vaporizer.

CLARENCE E. SPINDLER.